No. 722,089. PATENTED MAR. 3, 1903.
A. DE DION & G. BOUTON.
CHANGE GEAR FOR MOTOR ROAD VEHICLES.
APPLICATION FILED SEPT. 10, 1902.
NO MODEL. 2 SHEETS—SHEET 1.

Witnesses
Inventors,
Albert De Dion
Georges Bouton
By James L. Norris
Atty.

No. 722,089. PATENTED MAR. 3, 1903.
A. DE DION & G. BOUTON.
CHANGE GEAR FOR MOTOR ROAD VEHICLES.
APPLICATION FILED SEPT. 10, 1902.
NO MODEL. 2 SHEETS—SHEET 2.

Witnesses.
Robert Everett,
W. B. Keefer

Inventors.
Albert De Dion,
Georges Bouton,
By James L. Norris.
Atty.

UNITED STATES PATENT OFFICE.

ALBERT DE DION AND GEORGES BOUTON, OF PUTEAUX, FRANCE.

CHANGE-GEAR FOR MOTOR ROAD-VEHICLES.

SPECIFICATION forming part of Letters Patent No. 722,089, dated March 3, 1903.

Application filed September 10, 1902. Serial No. 122,861. (No model.)

*To all whom it may concern:*

Be it known that we, ALBERT DE DION, gentleman, and GEORGES BOUTON, engineer, citizens of the French Republic, residing at 36 Quae National, Puteaux, Seine, France, have invented certain new and useful Improvements in Change-Gears for Motor Road-Vehicles, of which the following is a specification.

This invention relates to change-gear for motor road-vehicles; and it consists in arrangements whereby either four different speeds or three different speeds and reverse movements are obtained with great facility, the characteristic features of the invention comprising an operating-shaft provided with a plurality of gear-wheels rotating therewith, a second shaft having four separate gear-wheels loosely mounted thereon in gear with said first-mentioned gear-wheels, a pair of friction-clutches mounted on said second shaft, and means for shifting said four gear-wheels on said second shaft relatively to said clutches and for throwing one of said clutches into engagement with one of said gear-wheels, whereby any one of said gear-wheels can be made to transmit its motion to said second shaft.

The accompanying drawings illustrate an arrangement according to this invention.

Figure 1:
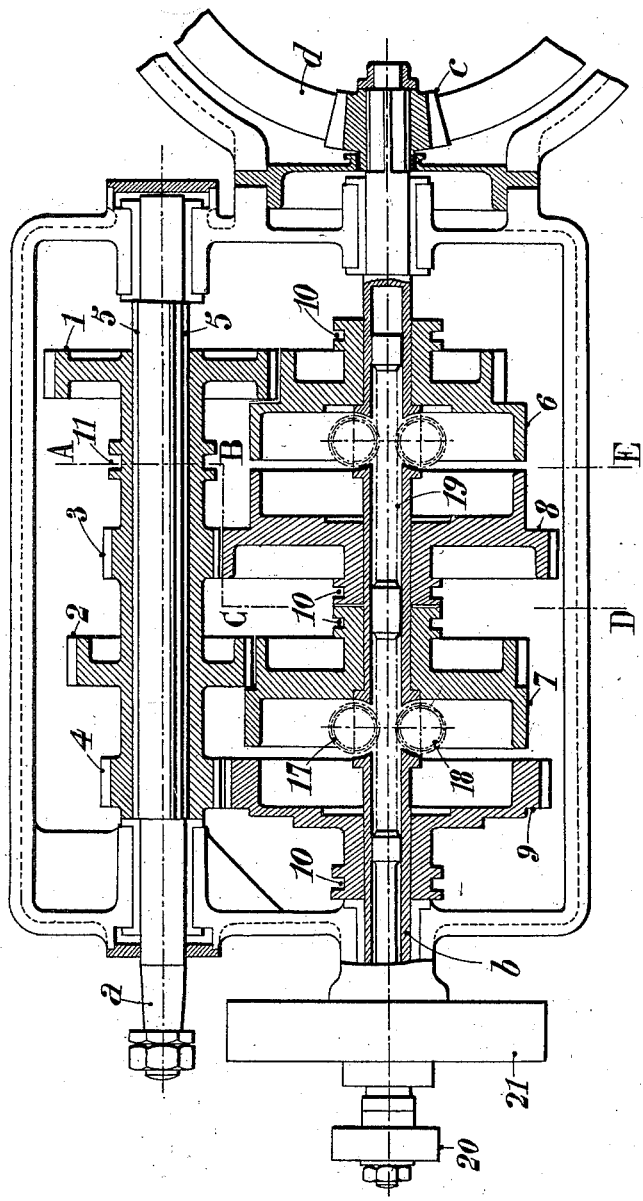
Figure 2:
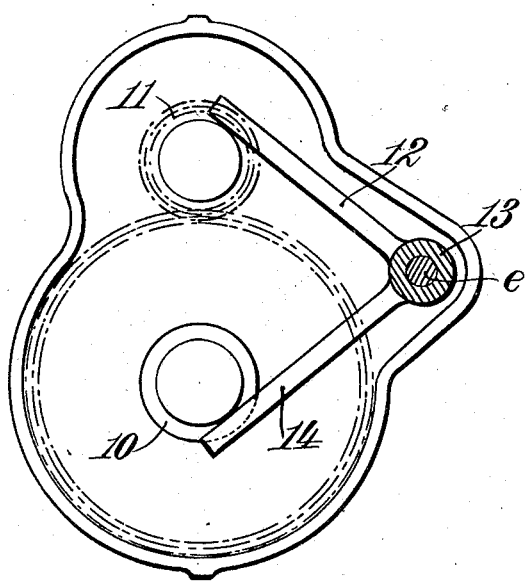
Figure 3:
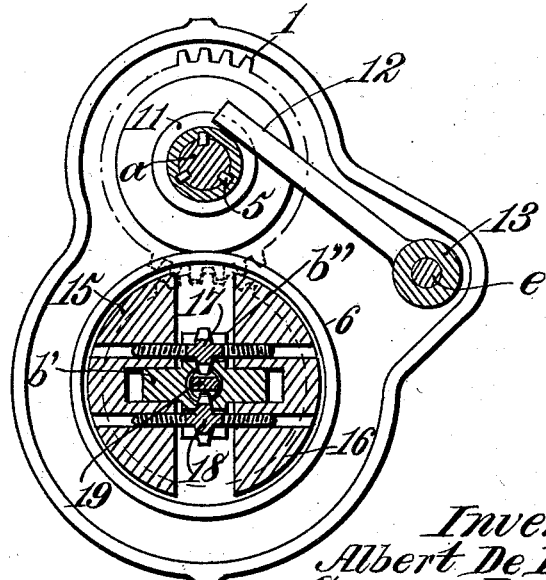

Figure 1 is a longitudinal section taken in a plane passing through the axes of the two shafts. Fig. 2 is a transverse section taken on the lines A B C D, Fig. 1; and Fig. 3 is a transverse section taken on the line A B E, Fig. 1, showing a form of friction-clutch suitable for use with mechanism according to this invention.

The shaft $a$, which is continuously rotated by the motor, carries a series of four toothed wheels 1, 2, 3, and 4, formed or connected together and mounted on the shaft $a$ by the groove-and-feather arrangement represented at 5, so that they rotate with the shaft $a$, but can be moved longitudinally thereon by a shifter engaging with the groove 11. The secondary shaft $b$, which transmits motion by the bevel-pinion $c$ through $d$ to the running wheel, carries a series of four cups or pulleys 6, 7, 8, and 9, mounted so as to turn freely on the said shaft, the said cups being provided with teeth, which gear, respectively, with the toothed wheels 1, 2, 3, and 4. The internal peripheries of these cups constitute bearing-surfaces for the frictional devices hereinafter described. These cups 6, 7, 8, and 9 are movable along the shaft $b$ by shifters, one engaging with a groove 10 in the boss of each cup. The longitudinal movement of both series of toothed wheels 1 2 3 4 and cups 6 7 8 9 is simultaneously effected, and it can be done by forks fixed to a sleeve 13 and movable by any suitable operating device along a shaft $e$, Figs. 2 and 3, the said sleeve being provided with one fork 12 for engaging with the groove 11 in the boss of the upper series of toothed wheels and with forks 14, one for each of the grooves 10, in the bosses of the series of wheels on the shaft $b$, so that by sliding the sleeve 13 the two series of wheels are simultaneously shifted longitudinally, the engaging teeth remaining in gear. If desired, however, the teeth of the wheels of either series may be made of sufficient width to remain in gear when the wheels on the shaft $b$ only are shifted longitudinally, and in this case it is not necessary to shift the series of wheels on the other shaft.

In order to connect either of the cups or pulleys 6, 7, 8, and 9, mounted on the shaft $b$, to the said shaft, so that the said shaft is driven, two pairs of segments are provided on the said shaft $b$, which segments constitute the internal members of friction-clutches, the outer members of such clutches being constituted by the cups within either the wheels 6 and 7 or the wheels 8 and 9, according to the position occupied by the said wheels on the shaft $b$. These clutches are preferably constructed as follows and as shown in Fig. 3: At each place where the said segments are carried the shaft $b$ is cross-shaped in transverse section, two opposite arms $b'$ of the cross acting as guides for the segments 15 16, and the other two opposite arms $b''$ constituting supports for two pinions 17 18, whose axes consist of right and left handed screws engaging in correspondingly-tapped holes in the respective segments 15 and 16, as shown in Fig. 3. The pinions 17 and 18 engage with a rack 19, capable of movement in the shaft $b$, which is hollow, the rack being provided with bearing-surfaces to guide it longitudinally in the said shaft. By shifting the said rack 19 in one or the other direction the pinions 17 18 are caused to turn, so that the screw-threads on their axes cause the segments 15 16 to move away from or toward each other, so as to come against the sides or internal peripheries of the cups in the wheels 6 and 7 or in the wheels 8 and 9 or to move away from the said sides or peripheries, so that the said wheels are thus clutched to or released from the shaft $b$. The rack 19 can be operated by any suitable mechanism—for example, by a lever, cam, or the like—acting on the roller 20.

21 represents a drum-brake keyed on the shaft $b$. This friction-clutch is of the kind described in Letters Patent granted to us, numbered 664,038, dated December 18, 1900.

The operation of the mechanism is as follows: The teeth of the wheels 1, 2, 3, and 4 are always in gear, respectively, with the teeth of the cups 6, 7, 8, and 9, and the segments of the clutches are always in the same position relatively to the shaft $b$. In Fig. 1 the parts are in such a position that the segments and pinions, which constitute both friction-clutches, are placed inside the cups 6 and 7, so that if the rack 19 be shifted either the cup 7 or the other cup 6 will be clutched to the shaft, according to the direction in which the rack 19 is moved, so that the said shaft $b$ will be rotated at a speed depending on the diameters of the gear-wheels 1 and 6 or 2 and 7, corresponding in the example illustrated to full speed and medium speed, respectively. If the series of wheels be shifted toward the right hand of Fig. 1, the cups 9 and 8 will come opposite the segments of the clutches, and then if the rack 19 be now moved to the right or left either the cup 8 or the cup 9 will be clutched to the shaft $b$ (according to the direction in which the rack 19 is moved) for advancing at the slower speeds, or if an intermediate pinion be employed to transmit motion from one of the wheels on the shaft $a$ to one of the wheels on the shaft $b$—for instance, from the wheel 4 to the wheel 9—backward movement will be transmitted to the vehicle when the wheel 9 is clutched to the shaft $b$. By simply moving the sleeve 13 longitudinally and shifting the rack 9 either four different speeds or three different speeds and backward movement can be obtained with great facility. Since the teeth of the wheels 1, 2, 3, and 4 are never out of gear with the teeth of their respective wheels on the shaft $b$ and the clutches are friction-clutches put on and taken off as described, there will be no jars or shocks on the teeth at starting, which is an objection in change-gears as hitherto constructed.

Having now particularly described and ascertained the nature of the said invention and in what manner the same is to be performed, we declare that what we claim is—

1. In a change-gear for motor road-vehicles the combination of a shaft, a plurality of gear-wheels on said shaft, revolving therewith, a second shaft, a pair of clutches on said shaft, four gear-wheels on said second shaft operated by said first-mentioned gear-wheels, means for shifting said last-mentioned gear-wheels relatively to said clutches so as to bring the first and third or second and fourth gear-wheels adjacent to said clutches, and means for operating one of said clutches independently of the other.

2. In a change-gear for motor road-vehicles the combination of a shaft four gear-wheels on said shaft, rotating therewith, a hollow shaft, a movable rack in said hollow shaft, a pair of friction-clutches on said hollow shaft in engagement with said rack, four gear-wheels on said hollow shaft operated by said first-mentioned gear-wheels, each of said gear-wheels being provided with a cup to be engaged by one of said clutches, and means for shifting said last-mentioned gear-wheels on said hollow shaft relatively to said clutches so as to bring the cups of the first and third gear-wheels or the cups of the second and fourth gear-wheels adjacent to said clutches.

3. In a change-gear for motor road-vehicles, the combination of a shaft, a longitudinally-movable sleeve mounted on said shaft, rotating therewith, four gear-wheels rigidly mounted on said sleeve, a hollow shaft, a movable rack in said hollow shaft, a pair of friction-clutches on said hollow shaft in engagement with said rack, four gear-wheels loosely mounted on said hollow shaft, operated by said first-mentioned gear-wheels, each of said last-mentioned gear-wheels being provided with a cup to be engaged by one of said friction-clutches, and means for shifting said last-mentioned gear-wheels on said hollow shaft and for shifting said sleeve so as to bring the first and third or the second and fourth of said last-mentioned gear-wheels adjacent to said friction-clutches.

In testimony whereof we have hereunto set our hands in presence of two subscribing witnesses.

ALBERT DE DION.
GEORGES BOUTON.

Witnesses:
EDWARD P. MACLEAN,
EMILE KLOTZ.